(12) United States Patent
Jeong et al.

(10) Patent No.: US 10,942,590 B2
(45) Date of Patent: Mar. 9, 2021

(54) TOUCH-SENSITIVE DISPLAY DEVICE AND METHOD OF FABRICATING SAME

(71) Applicant: Samsung Display Co., Ltd, Yongin-si (KR)

(72) Inventors: Jong Han Jeong, Yongin-si (KR); Ha Da Chang, Yongin-si (KR); Hyoung Wook Jang, Yongin-si (KR)

(73) Assignee: Samsung Display Co., Ltd.

( * ) Notice: Subject to any disclaimer, the term of this patent is extended or adjusted under 35 U.S.C. 154(b) by 230 days.

(21) Appl. No.: 15/262,825

(22) Filed: Sep. 12, 2016

(65) Prior Publication Data

US 2017/0075478 A1 Mar. 16, 2017

(30) Foreign Application Priority Data

Sep. 16, 2015 (KR) .......................... 10-2015-0130717

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05); *G06F 3/04164* (2019.05); *G06F 2203/04103* (2013.01); *G06F 2203/04107* (2013.01); *G06F 2203/04111* (2013.01)

(58) Field of Classification Search
None
See application file for complete search history.

(56) References Cited

U.S. PATENT DOCUMENTS

| 8,217,913 | B2 | 7/2012 | Hotelling et al. |
| 8,436,830 | B2 | 5/2013 | Teramoto |
| 8,585,455 | B1* | 11/2013 | Cok ...................... G06F 3/0412 |
| | | | 313/503 |
| 2009/0194344 | A1* | 8/2009 | Harley .................... G06F 3/044 |
| | | | 178/18.06 |
| 2010/0053115 | A1* | 3/2010 | Kim ...................... G06F 3/0412 |
| | | | 345/174 |
| 2010/0144391 | A1* | 6/2010 | Chang ................. G02F 1/13338 |
| | | | 455/566 |
| 2010/0295819 | A1* | 11/2010 | Ozeki ..................... G06F 3/044 |
| | | | 345/174 |
| 2011/0128240 | A1 | 6/2011 | Choi |
| 2014/0118277 | A1* | 5/2014 | Kim ....................... G06F 3/044 |
| | | | 345/173 |

(Continued)

FOREIGN PATENT DOCUMENTS

| KR | 10-2011-0048686 A | 5/2011 |
| KR | 10-1050900 B1 | 7/2011 |

(Continued)

*Primary Examiner* — Christopher R Lamb
(74) *Attorney, Agent, or Firm* — Innovation Counsel LLP (57) ABSTRACT

A display device includes: a substrate including a plurality of pixel regions; a first electrode arranged on each of the pixel regions of the substrate; an organic layer arranged on the first electrode; a second electrode including a plurality of second electrode patterns each at least partially overlapping respective ones of the pixel regions and arranged on the organic layer; and a plurality of sensing lines spaced apart from the first electrode on the same plane or layer as the first electrode, the sensing lines being connected to respective ones of the second electrode patterns.

15 Claims, 6 Drawing Sheets

(56) References Cited

U.S. PATENT DOCUMENTS

| 2014/0210774 A1* | 7/2014 | Kim | G06F 3/044 345/174 |
| 2015/0090395 A1* | 4/2015 | Lin | G06F 1/1692 156/239 |
| 2015/0162387 A1* | 6/2015 | Gu | H01L 27/323 345/174 |

FOREIGN PATENT DOCUMENTS

| KR | 10-1322981 B1 | 10/2013 |
| KR | 10-1346421 B1 | 1/2014 |

\* cited by examiner

FIG. 15

TOUCH-SENSITIVE DISPLAY DEVICE AND METHOD OF FABRICATING SAME

CROSS-REFERENCE TO RELATED APPLICATION

This application claims priority to, and the benefit of, Korean Patent Application No. 10-2015-0130717 filed on Sep. 16, 2015 in the Korean Intellectual Property Office, the entire contents of which are incorporated herein by reference in their entirety.

BACKGROUND

1. Field

Embodiments of the present invention relate generally to display devices. More specifically, embodiments of the present invention relate to touch-sensitive display devices and their fabrication.

2. Description of the Related Art

A touch screen is an input device to which a user inputs predetermined information by pressing or touching a touch sensor in the touch screen while looking at a display device. In general, the touch screen is attached to a display panel.

Recently, the touch screen has been integrated into the display panel for slimming of a portable terminal such as a smart phone or a tablet PC. Particularly, an in-cell type touch screen integrated display device, in which elements forming the touch screen are arranged in a cell of the display panel, is being developed.

SUMMARY

Embodiments of the present invention provide a display device with a touch screen integrated into the display device. In addition, embodiments of the present invention provide a fabrication method for the display device.

A display device according to an exemplary embodiment may include a substrate including a plurality of pixel regions; a first electrode disposed in each of the pixel regions of the substrate; an organic layer disposed on the first electrode; a second electrode including a plurality of second electrode patterns each at least partially overlapping respective ones of the pixel regions and disposed on the organic layer; and a plurality of sensing lines spaced apart from the first electrode on the same plane or layer as the first electrode, the sensing lines being connected to respective ones of the second electrode patterns.

The display device may further comprise an electrode separation pattern disposed between adjacent second electrode patterns and including an insulating material. An adhesive force between the second electrode patterns and the electrode separation patterns may be less than 1/10 of an adhesive force between the second electrode patterns and the organic layer.

The display device may further comprise a pixel definition layer including an opening exposing the first electrode in the pixel regions, and contact holes exposing the sensing lines, wherein the second electrode patterns are connected to respective sensing lines through the contact holes.

The first electrode and the sensing lines may comprise a same material. The sensing lines may be arranged between adjacent pixel regions, and extend in one direction.

The second electrode patterns may comprise first sensing electrodes electrically connected though the sensing lines and including a plurality of sensing cells successively arranged along the first direction; and second sensing electrodes each extending along a second direction crossing the first direction, wherein the sensing cells and the second sensing electrodes are spaced apart from each other. The display device may further comprise ground patterns arranged between the sensing cells and the second sensing electrodes.

The second electrode patterns may include a plurality of sensing cells each having an island shape, and the sensing cells may be connected to respective ones of the sensing lines.

A method of manufacturing a display device may comprise receiving a substrate including a plurality of pixel regions; forming first electrodes disposed in the pixel regions of the substrate, and sensing lines spaced apart from the first electrodes; forming a pixel definition layer exposing the first electrodes; forming an organic layer on the first electrodes; and forming a second electrode arranged on the organic layer. The second electrode includes second electrode patterns each at least partially overlapping a respective one of the pixel regions, the second electrode patterns being connected to the sensing lines.

The forming a second electrode may further comprise forming an electrode separation pattern exposing a plurality of regions that overlap respective pixel regions; forming a contact hole in the organic layer and the pixel definition layer, the contact hole exposing the sensing lines; and forming the second electrode patterns by depositing a conductive material in the regions exposed by the electrode separation patterns.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. The various figures thus may not be to scale. It will be understood that when an element is referred to as being "between" two elements, it can be the only element between the two elements, or one or more intervening elements may also be present. Like reference numerals refer to like elements throughout.

DETAILED DESCRIPTION

Example embodiments will now be described more fully hereinafter with reference to the accompanying drawings. All numerical values are approximate, and may vary. All examples of specific materials and compositions are to be taken as nonlimiting and exemplary only. Other suitable materials and compositions may be used instead.

Figure 1:
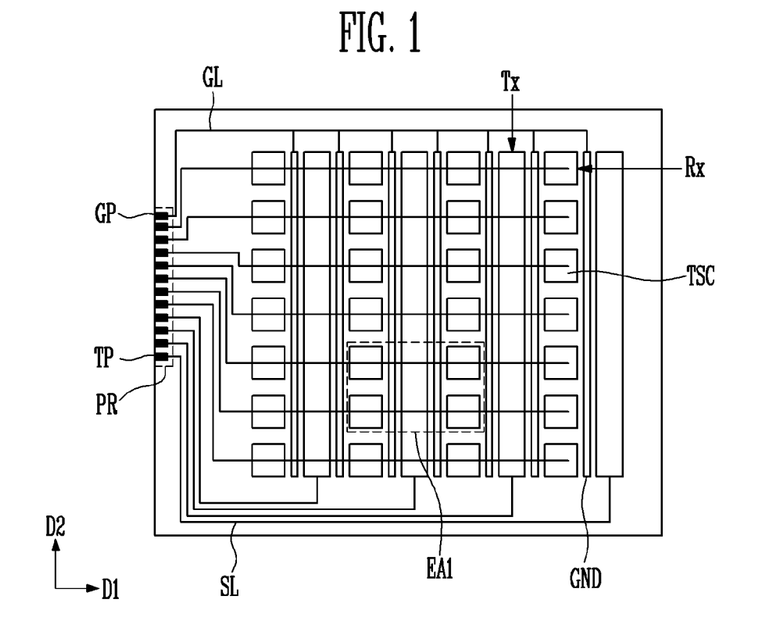
FIG. 1 is a plan view diagram of a display device according to an embodiment.
Figure 2:
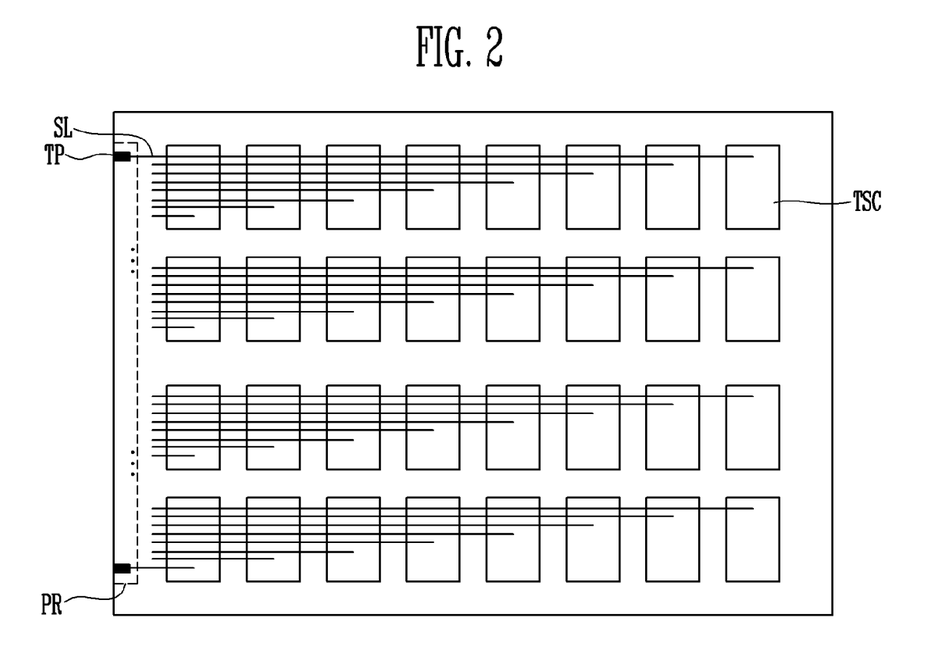
FIG. 2 is a plan view diagram of a display device according to another embodiment.

FIG. 1 is a plan view diagram of a display device according to an embodiment and FIG. 2 is a plan view diagram of a display device according to another embodiment.

Referring to FIGS. 1 and 2, a touch screen (not illustrated) is installed in the display device and the touch screen may sense a touch position of a user.

The display device may include a first substrate (not illustrated), a second substrate (not illustrated), and a display element (not illustrated) arranged between the first and second substrates. One of the first and second substrates may include a gate line (not illustrated), a data line (not illustrated) which intersects with the gate line, and at least one of the thin film transistors which are connected to the gate line and the data line. Such a configuration is known.

The display element may be connected to the thin film transistor. The display element may be any type of display element, e.g. one of a liquid crystal display device (LCD device), an electrophoretic display device (EPD device), an electrowetting display device (EWD device), and an organic light emitting display device (OLED device). An organic light emitting display element as an example of the display element will be described in detail according to the embodiment, for convenience of explanation.

Further, the display device may include a plurality of sensing electrodes which sense the user's touch input, and a plurality of sensing lines SL which input a touch scan signal to the sensing electrodes or transmit a touch sensing signal generated in the sensing electrodes.

The sensing electrodes may operate as one of the electrodes of the display element. The sensing electrodes may also operate as the touch-detecting electrodes which sense the touch position of the user.

The sensing electrodes may be arranged and configured as different types according to the desired touch sensing type. For example, as illustrated in FIG. 1, the sensing electrodes may be arranged as mutual capacitance touch screen type electrodes. In other words, the sensing electrodes may include a plurality of first sensing electrodes Rx laid out along a first direction D1, and a plurality of second sensing electrodes Tx extending along a second direction D2 crossing the first direction D1. The first sensing electrode Rx and the second sensing electrode Tx may be connected to the sensing lines SL.

The first sensing electrodes Rx may include a plurality of sensing cells TSC laid out along the first direction D1. The sensing lines SL connected to the first sensing electrodes Rx may extend in the first direction D1 along which the sensing cells TSC are arranged, and may electrically connect the sensing cells TSC.

Further, the sensing cells TSC and the second sensing electrodes Tx may be spaced apart from each other.

Ground patterns GND may be arranged between the sensing cells TSC and the second sensing electrodes Tx. The ground patterns GND may be connected to a ground line GL. The ground pattern GND may reduce the noise of touch sensing.

A pad part PR may be arranged on one side of the display device, and the pad part PR may include a plurality of pads TP and GP. For example, the pad part PR may include a plurality of sensing pads TP connected to the sensing lines SL, as well as a ground pad GP connected to the ground line GL.

As shown in FIG. 2, the sensing electrodes may be arranged to form a self capacitance type touch screen. In other words, the sensing electrodes may include a plurality of sensing cells TSC each having an island shape. The sensing cells TSC may be connected to respective sensing lines SL.

Further, in the self capacitance type touch screen, the sensing lines SL may be connected to respective sensing pads TP of the pad part PR.

The display device will be described more fully hereinafter with reference to the exemplary structure of FIG. 1.

Figure 3:
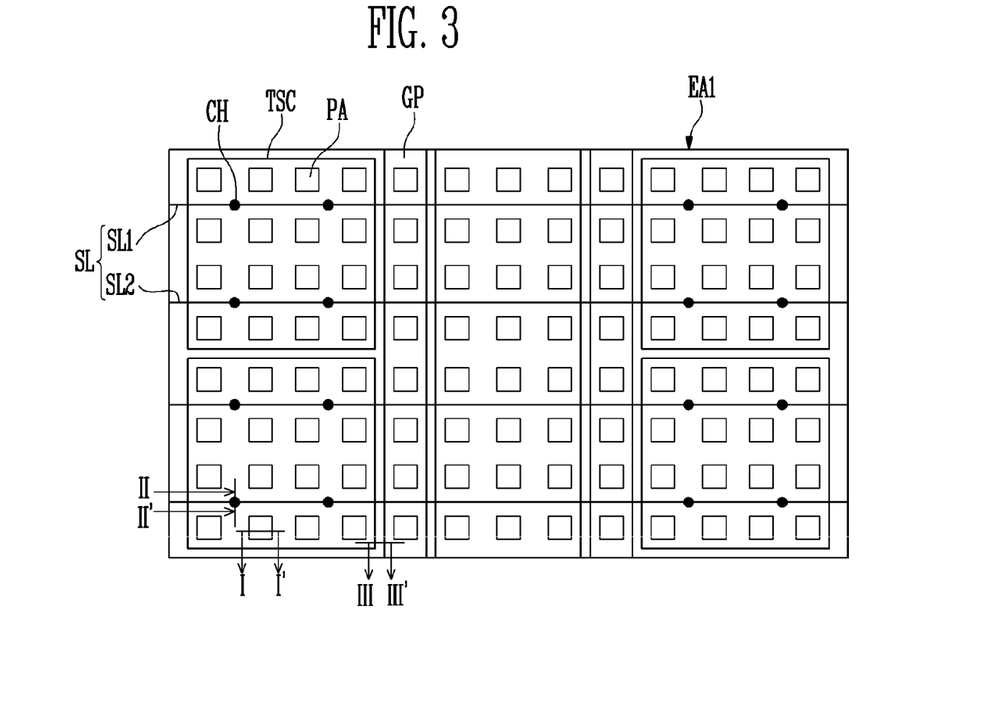
FIG. 3 is an enlarged view of a region EA1 of FIG. 1.
Figure 4:
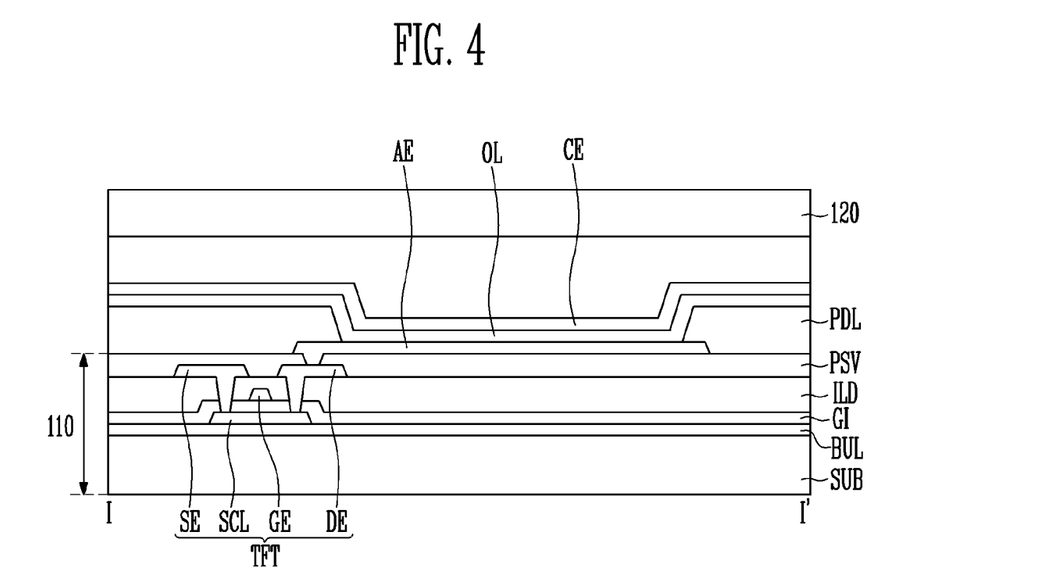
FIG. 4 is a cross-sectional diagram taken along line I-I' of FIG. 3.
Figure 5:
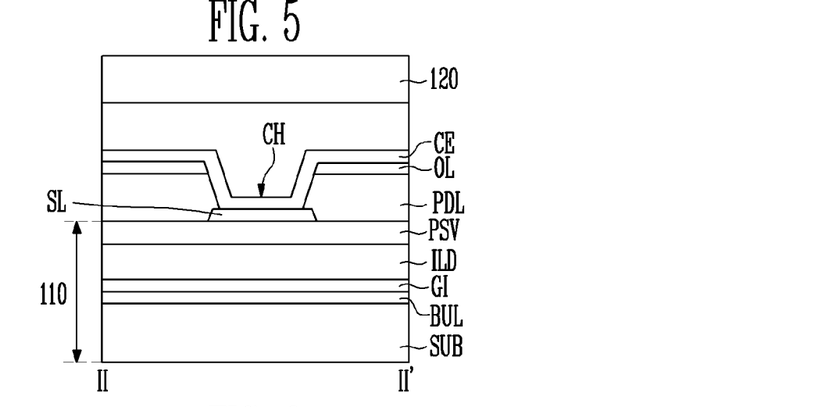
FIG. 5 is a cross-sectional diagram taken along line II-II' of FIG. 3.
Figure 6:
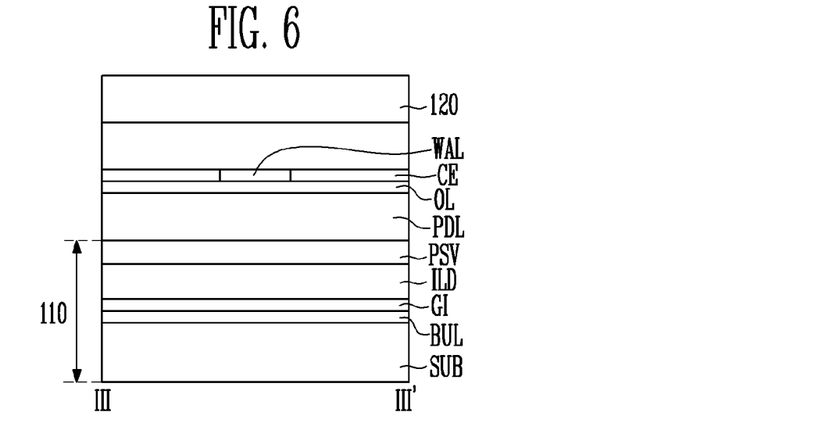
FIG. 6 is a cross-sectional diagram taken along line III-III' of FIG. 3.

FIG. 3 is an enlarged view of region EA1 of FIG. 1, FIG. 4 is a cross-sectional diagram taken along line I-I' of FIG. 3, FIG. 5 is a cross-sectional diagram taken along line II-II' of FIG. 3 and FIG. 6 is a cross-sectional diagram taken along line III-III' of FIG. 3.

Referring to FIGS. 1 and 3 to 6, the display device may include a first substrate 110 that has a plurality of pixel regions PA, a second substrate 120 opposite to the first substrate 100, and display elements arranged in the pixel regions PA between the first substrate 110 and the second substrate 120, respectively.

The first substrate 110 may include a base substrate SUB and at least one thin film transistor TFT arranged in each of the pixel regions PA on the base substrate SUB. In the pixel regions PA, the thin film transistor TFT may be connected to one of the display elements.

The base substrate SUB may include a transparent insulating material and may thus transmit light. Further, the base substrate SUB may be a rigid substrate or a flexible substrate. The rigid substrate may include a glass substrate, a quartz substrate, a glass ceramic substrate and a crystalline glass substrate. The flexible substrate may include a film substrate including a high molecular weight organic material and a plastic substrate. For example, the base substrate SUB may include one of Polyethersulfone (PES), Polyacrylate, Polyetherimide (PEI), Polyethylene Naphthalate (PEN), Polyethylene Terephthalate (PET), Polyphenylene Sulfide (PPS), Polyarylate (PAR), Polyimide (PI), Polycarbonate (PC), Triacetate Cellulose (TAC) and Cellulose Acetate Propionate (CAP). Further, the base substrate SUB may include Fiber Glass Reinforced Plastic (FRP).

The material of the base substrate SUB may be resistant to the high process temperatures of the display device's manufacturing process. That is, the base substrate SUB may be made of a material having a high heat resistance.

A buffer layer BUL may be arranged between the base substrate SUB and the thin film transistor TFT. The buffer layer BUL may include at least one of Silicon Oxide (SiOx) and Silicon Nitride (SiNx). The buffer layer BUL may prevent impurities from spreading from the base substrate SUB to a semiconductor layer SCL. Further, the buffer layer BUL may planarize a surface of the base substrate SUB.

The thin film transistor TFT may be connected to a gate line and a data line. The thin film transistor TFT may include the semiconductor layer SCL, a gate electrode GE, a source electrode SE and a drain electrode DE.

The semiconductor layer SCL may be arranged on the buffer layer BUL. The semiconductor layer SCL may include one of amorphous Silicon (a-Si), Polycrystal (poly Si), an oxide semiconductor and an organic semiconductor. On the semiconductor layer SCL, regions connected to the source electrode SE and the drain electrode DE may be the source region and the drain region respectively, and may be doped or injected with impurities. The region between the source region and the drain region may be a channel region. The oxide semiconductor may include at least one of Zinc (Zn), Indium (In), Gallium (Ga), Tin (Sn) and the mixture thereof. For example, the oxide semiconductor may include Indium-Gallium-Zinc Oxide (IGZO).

When the semiconductor layer SCL includes oxide semiconductor, a light shield layer (not shown) may be included and arranged to block light input to the semiconductor layer SCL of the top and bottom parts of the semiconductor layer SCL.

A gate insulating layer GI may be arranged on the semiconductor layer SCL. The gate insulating layer GI may cover the semiconductor layer SCL, and insulate the semiconductor layer SCL and gate electrode GE from each other. The gate insulating layer GI may include at least one of SiOx and SiNx.

The gate electrode GE may be arranged on the gate insulating layer GI. The gate electrode GE may be connected to a gate line. For example, the gate electrode GE may be the protruding part of its gate line. The gate electrode GE may be arranged to overlap the semiconductor layer SCL. The gate electrode GE may include a low resistance conductive material.

An interlayer insulating layer ILD may be arranged on the gate electrode GE. The interlayer insulating layer ILD may include the same materials as the gate insulating layer GI. For example, the interlayer insulating layer ILD may include one of SiOx and SiNx. The interlayer insulating layer ILD may expose the source region and the drain region.

The source electrode SE and the drain electrode DE may be spaced apart from each other on the interlayer insulating layer ILD. The source electrode SE and the drain electrode DE may include a low resistance conductive material. The source electrode SE and the drain electrode DE may be insulated from the gate electrode GE by the interlayer insulating layer ILD. Further, the source electrode SE and the drain electrode DE may be connected to the source region and the drain region, respectively. The source electrode SE may be connected to a data line. For example, the source electrode SE may be a protruding feature of its data line.

The embodiment discloses a thin film transistor TFT configured as a top gate structure TFT, but the thin film transistor TFT is not limited to this configuration. As another example, the thin film transistor TFT may be a bottom gate structure TFT.

A passivation layer PSV may be arranged on the base substrate SUB upon which the thin film transistor TFT is arranged. In other words, the passivation layer PSV may cover the thin film transistor TFT. Further, part of the passivation layer PSV may be eliminated, so that the part of the drain electrode DE may be exposed.

The passivation layer PSV may include at least one layer. For example, the passivation layer PSV may include an inorganic passivation layer, or an organic passivation layer arranged on the inorganic passivation layer. The passivation layer PSV may include at least one of SiOx and SiNx. The organic passivation layer may include one of Acryl, Polyimide (PI), Polyamide (PA) and Benzocyclobutene (BCB).

Further, since the organic passivation layer is transparent and has liquidity, the organic passivation layer may be a planarizing layer which flattens the curve of the bottom structure for planarization.

The display elements may be arranged on the passivation layer PSV. The display elements may be organic light emitting display elements.

Each of the display elements may include a first electrode AE connected to the drain electrode DE, an organic layer OL arranged on the first electrode AE, and a second electrode CE arranged on the organic layer OL.

One of the first electrode AE and the second electrode CE may be an anode electrode, and the other one may be a cathode electrode. For example, the first electrode AE may be the anode electrode and the second electrode CE may be the cathode electrode.

Further, one of the first electrode AE and the second electrode CE may be a transmission type electrode. For example, when the display element is a bottom emission type organic light emitting display device, the first electrode AE may be a transmission type electrode, and the second electrode CE may be a reflective type electrode. When the display element is a top emission type organic light emitting display device, the first electrode may be the reflective type electrode, and the second electrode CE may be the transmission type electrode. When the display element is a double-sided organic light emitting display device, both of the first electrode AE and the second electrode CE may be transmission type electrodes. In the exemplary embodiment, the display element is part of a top emission type organic light emitting display device.

In each of the pixel regions PA, the first electrode AE may be arranged on the passivation layer PSV. The first electrode AE may include a reflective layer (not illustrated) capable of reflecting light, and a transparent conductive layer (not illustrated) arranged on the top or the bottom side of the reflective layer. At least one of the transparent conductive layers or the reflective layers may be connected to the drain electrode DE.

The reflective layer may include a material capable of reflecting light. For example, the reflective layer may include Aluminum (Al), Silver (Ag), Chromium (Cr), Molybdenum (Mo), Platinum (Pt), Nickel (Ni) and/or an alloy thereof.

The transparent conductive layer may include a transparent conductive oxide. For example, the transparent conductive layer may include at least one of Indium Tin Oxide (ITO), Indium Zinc Oxide (IZO), Aluminum Zinc Oxide (AZO), Gallium doped Zinc Oxide (GZO), Zinc Tin Oxide (ZTO), Gallium Tin Oxide (GTO) and Fluorine doped Tin Oxide (FTO).

A pixel definition layer PDL may be arranged on the first electrode AE. The pixel definition layer PDL may be arranged between the pixel regions PA, and may include an opening which exposes the first electrode AE. Further, the pixel definition layer PDL may overlap the edge part of the first electrode AE. Accordingly, each opening of the pixel definition layer PDL may expose the surface of a first electrode AE.

The pixel definition layer PDL may include an organic insulating material. For example, the pixel definition layer PDL may include at least one of Polystyrene, Polymethylmethacrylate (PMMA), Polyacrylonitrile (PAN), Polyamide (PA), Polyimide (PI), Polyarylether (PAE), Heterocyclic Polymer, Parylene, Epoxy resin, Benzocyclobutene (BCB), Epoxy resin, Siloxane based resin and Silane based resin.

The organic layer OL may include a multilayer thin film structure including at least a light emitting layer EML. For example, the organic layer may include a hole injection layer HIL which injects holes, a hole transport layer HTL which has excellent transport ability for holes and which increases the chances of recombination of holes and electrons by suppressing the movement of electrons not combined on the light emitting layer EML, the light emitting layer EML which emits light by the recombination of holes and electrons, a hole blocking layer HBL to suppress the movement of holes which are not combined on the light emitting layer EML, an electron transport layer ETL to transfer electrons to the light emitting layer EML smoothly, and an electron injection layer EIL which injects electrons.

The hole injection layer HIL, the hole transport layer HTL, the hole blocking layer HBL, the electron transport layer ETL and the electron injection layer EIL may be common layers connected across multiple pixel regions PA The color of the light generated by the light emitting layer EML may be one of red, green, blue and white, but the color is not limited to the colors listed, and may be any color. For example, the color of the light generated by the light emitting layer of the organic layer OL may be one of magenta, cyan, and yellow.

The second electrode CE may be arranged on the organic layer OL. The second electrode CE may include a plurality of second electrode patterns each overlapping part of the pixel regions PA. The second electrode patterns may be spaced apart from each other. The second electrode patterns may include the first sensing electrodes Rx including a plurality of sensing cells TSC illustrated in FIG. 1, the second sensing electrodes Tx, and the ground patterns GND.

The second electrode CE may be a semi-transmitting reflective layer. In other words, the second electrode CE may transmit part of the light generated from the light emitting layer EML, and reflect the rest of the light generated from the light emitting layer EML. For example, the second electrode CE may be a thin metal layer having a thickness large enough to transmit some but not all of the light.

The second electrode CE may include materials having a lower work function than that of the transparent conductive layer. For example, the second electrode CE may include at least one of Molybdenum (Mo), Tungsten (W), Silver (Ag), Magnesium (Mg), Aluminum (Al), Platinum (Pt), Palladium (Pd), Gold (Au), Nickel (Ni), Neodymium (Nd), Iridium (Ir), Chromium (Cr), Lithium (Li), Calcium (Ca) and any mixture thereof.

As both the second electrode CE and the reflective layer of the first electrode AE are reflective, light from the organic layer OL may resonate between the reflective layer and the second electrode CE. The light extraction effects of the display element may be improved by resonance of this repeatedly-reflected light.

The distance between the reflective layer and the second electrode CE may vary according to the color of the light. In other words, according to the color of the emitted light from the organic layer OL, the distance between the reflective layer and the second electrode CE may be controlled to correspond to resonance distance.

An electrode separation pattern WAL may be arranged between adjacent second electrode CE patterns. The electrode separation pattern WAL may include an insulating material. Further, the electrode separation pattern WAL may have a low adhesion with the second electrode patterns. For example, the adhesive force between the second electrode patterns and the electrode separation pattern WAL may be less than 1/10 of the adhesive force between the second electrode patterns and the organic layer OL.

The sensing lines SL and the ground line GL may have the same material as the first electrode AE and may be arranged on the passivation layer PSV. For example, the sensing lines SL and the ground line GL may include a reflective layer and a transparent conductive layer arranged on the reflective layer. The sensing lines SL and the ground line GL may be covered by the pixel definition layer PDL.

The sensing lines SL and the ground line GL may be connected to the second electrode patterns through contact holes CH in the pixel definition layer PDL. For example, the sensing lines SL may connect the sensing cells TSC of the first sensing electrodes Rx and the second sensing electrodes Tx through the contact hole CH. The sensing lines SL may be arranged between the pixel regions PA, and extended along one side of the display. For example, the sensing lines SL may extend along the direction in which the sensing cells TSC of the first sensing electrodes Rx are arranged.

The ground line GL may connect the ground pattern GND through a contact hole CH.

The second substrate 120 may isolate the display element from the external environment. Further, the second substrate 120 may be an opposed substrate facing the first substrate 110. The second substrate 120 may have the same material as the base substrate SUB. The second substrate 120 may be bonded to the first substrate 110 with a sealant.

Further, a filler (not illustrated) may be arranged between the first substrate 110 and the second substrate 120. The filler may buffer the display element from external shock. Further, when the filler has an absorbing capability, the filler may absorb moisture which would otherwise infiltrate and damage the display element.

The second substrate 120 may be applied to isolate the display element from the external environment, but the present invention is not limited thereto. For example, the display element may be an inorganic layer (not illustrated) covering the display element and a sealing layer including a plurality of organic layers (not illustrated). The sealing layer may be arranged on the second electrode CE, and may block infiltration of moisture and oxygen to the display element. The inorganic layer may include at least one of Silicon Oxide (SiOx), Silicon Nitride (SiNx), Silicon Oxynitride (SiON), Aluminum Oxide (Al2O3), Titanium Oxide (TiO2), Zirconium Oxide (ZrOx) and Tin Oxide (ZnO).

In the display device, the electrode patterns of the second electrode CE may be electrodes of the display elements, e.g. may be common electrodes connected to a common line for display purposes, and may function as sensing electrodes of the touch screen at the same time. Further, since the second electrode patterns are connected to the sensing lines SL, an IR-drop phenomenon of the second electrode patters may be blocked.

Figure 7:
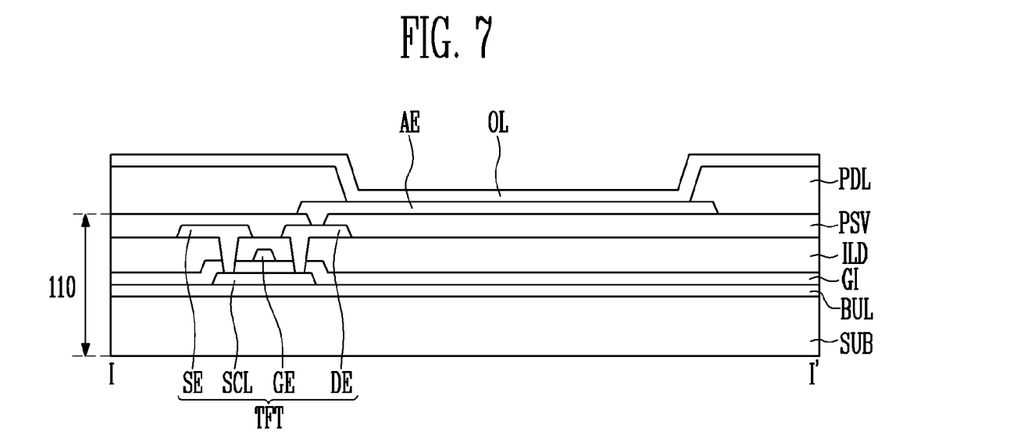
FIGS. 7, 8, and 9 are process cross-sectional diagrams taken along line I-I' of FIG. 3.
Figure 8:
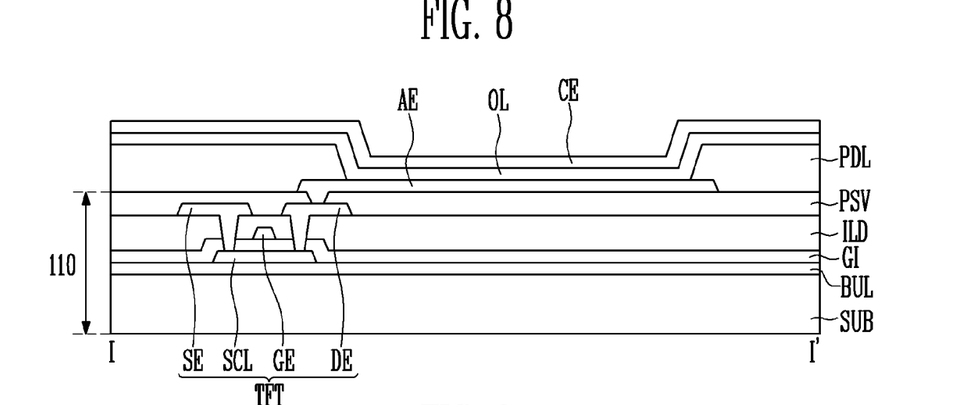
Figure 9:
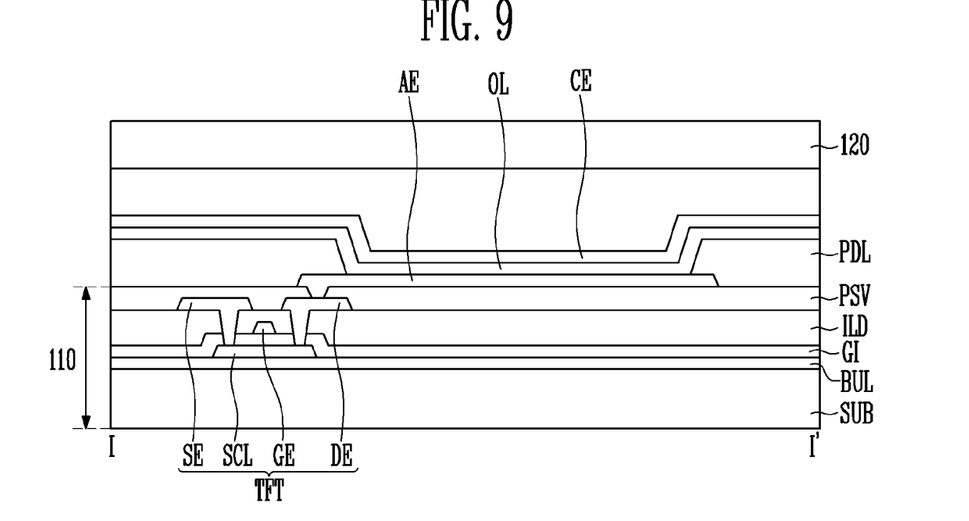

FIGS. 7 to 9 are process cross-sectional diagrams taken along line I-I' of FIG. 3, FIGS. 10 to 12 are process cross-sectional diagrams taken along line II-II' of FIG. 3, and FIGS. 13 to 15 are process cross-sectional diagrams taken along line of FIG. 3.

Figure 10:
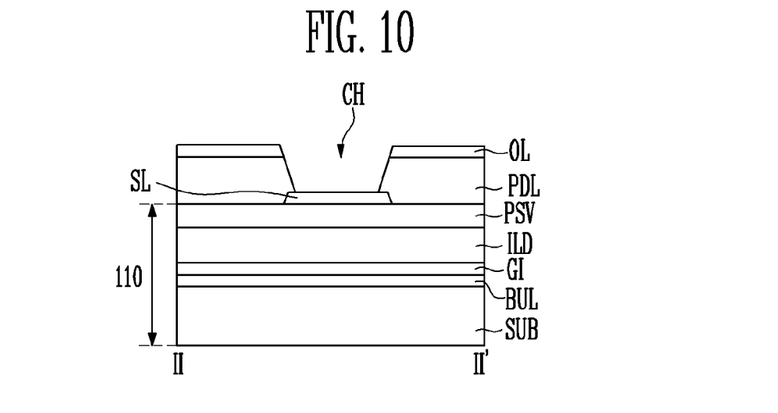
FIGS. 10, 11, and 12 are process cross-sectional diagrams taken along line II-II' of FIG. 3.
Figure 13:
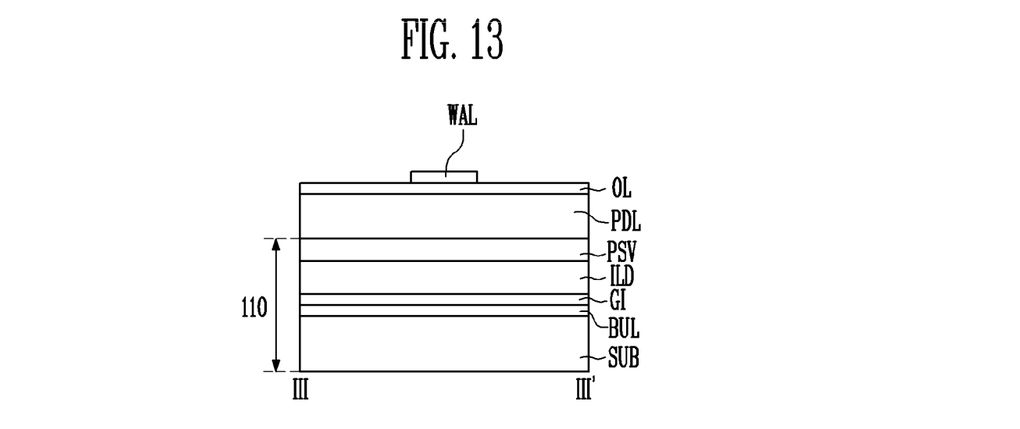
FIGS. 13, 14, and 15 are process cross-sectional diagrams taken along line III-III' of FIG. 3.

Referring to FIGS. 7, 10 and 13, the first substrate 110 may be manufactured to include the thin film transistor TFT formed on the base substrate SUB.

More specifically, the first substrate 110 may be manufactured as follows.

First, the buffer layer BUL may be formed on the base substrate SUB.

The base substrate SUB may include the pixel regions PA. Further, the base substrate SUB may be a rigid substrate or a flexible substrate.

The buffer layer BUL may be formed through a deposition process, such as a plasma chemical vaper deposition process. Further, the buffer layer BUL may include at least one of SiOx and SiNx.

After forming the buffer layer BUL, each thin film transistor TFT including a semiconductor layer SCL, a gate electrode GE, a source electrode SE and a drain electrode DE may be formed on the buffer layer in a pixel region PA.

The thin film transistor TFT may be formed as follows.

First, the semiconductor layer SCL may be formed on the buffer layer BUL. The semiconductor layer SCL may include at least one of amorphous Silicon (a-Si), Polycrystal Silicon (poly Si), an oxide semiconductor and an organic semiconductor.

After forming the semiconductor layer SCL, a gate insulating layer GI which covers the semiconductor layer SCL may be formed. The gate insulating layer GI may be formed by a deposition process such as a plasma chemical vaper deposition process. Further, the gate insulating layer GI may include at least one of SiOx and SiNx.

After forming the gate insulating layer GI, the gate electrode GE may be formed to extend from a gate line on the gate insulating layer GI. The gate electrode GE may be formed of a conductive material such as Aluminum (Al), Aluminum Alloy (Al alloy), Silver (Ag), Tungsten (W), Copper (Cu), Nickel (Ni), Chromium (Cr), Molybdenum (Mo), Titanium (Ti), Platinum (Pt), Tantalum (Ta), Neodymium (Nd), Scandium (Sc) and the mixture thereof, and may be formed by patterning the conductive layer.

After forming the gate electrode GE, the interlayer insulating layer ILD may be formed. The interlayer insulating layer ILD may cover the gate electrode GE. The interlayer insulating layer ILD may have or be made of the same material as the gate insulating layer GI. In other words, the interlayer insulating layer ILD may include at least one of SiOx and SiNx.

After forming the interlayer insulating layer ILD, part of the semiconductor layer SCL may be exposed by patterning the interlayer insulating layer ILD. The region exposed from under the semiconductor layer SCL may become the source region and the drain region upon which the source electrode SE and the drain electrode DE are later formed. The region between the source region and the drain region may be the channel region.

After patterning the interlayer insulating layer ILD, the source electrode SE and drain electrode DE are formed. The source electrode SE is formed to be connected to the data line on the interlayer insulating layer ILD, and the drain electrode DE is formed to be spaced apart from the source electrode SE. The source electrode SE and the drain electrode DE may be connected to each of the source region and the drain region. Further, the source electrode SE and the drain electrode DE may be formed from a conductive layer including a low resistance metal and may be formed by pattering the conductive layer.

After forming thin film transistor TFT, the passivation layer PSV may be formed. The passivation layer PSV may cover the thin film transistor TFT. The passivation layer PSV may include at least one layer. For example, the passivation layer PSV may include an inorganic layer and an organic layer arranged on the inorganic layer.

After forming the passivation layer PSV, part of the drain electrode DE may be exposed by patterning the passivation layer PSV.

The first electrode AE, the sensing line SL and the ground line GL connected to the drain electrode DE may be formed on the passivation layer PSV. For example, the first electrode AE, the sensing line SL and the ground line GL may be formed from a reflective layer (not illustrated) including a metal material which reflects light, and from a transparent conductive layer including a transparent conductive oxide material on the reflective layer. These elements may then be formed by pattering the reflective layer and the transparent conductive layer. Further, at least one of the transparent conductive layer and the reflective layer of the first electrode AE may be connected to the drain electrode DE.

After forming the first electrode AE, the sensing line SL and the ground line GL, the pixel definition layer PDL which exposes parts of the first electrode AE may be formed. The pixel definition layer PDL may be formed from an organic insulating layer deposited on the first electrode AE and the passivation layer PSV, and may be formed by patterning the insulating layer. The first electrode AE may be exposed by the patterning.

After forming the pixel definition layer PDL, the organic layer OL may be formed on the first electrode AE. The organic layer OL may have a multi-layer thin film structure including at least the light emitting layer EML. For example, as described previously, the organic layer may include a hole injection layer HIL, a hole transport layer HTL, a light emitting layer EML, a hole blocking layer HBL, an electron transport layer ETL, and an electron injection layer EIL.

The color of the light generated by the light emitting layer EML may be one of red, green, blue and white, but is not limited to these colors. For example, the color of the light generated by the light emitting layer of the organic layer OL may be one of magenta, cyan, and yellow.

After forming the organic layer OL, the electrode separation pattern WAL may be formed on the organic layer OL. The electrode separation pattern WAL may include an insulating material. The insulating material may have a relatively low adhesion to metal material, as described above. Further, the electrode separation pattern WAL may be formed to be located between adjacent electrodes and outside the pixel regions.

After forming the electrode separation patterns WAL, a contact hole CH which exposes the sensing line SL is formed. The contact hole CH may be formed by laser. Accordingly, the sensing line SL may be exposed by the contact hole CH.

Figure 11:
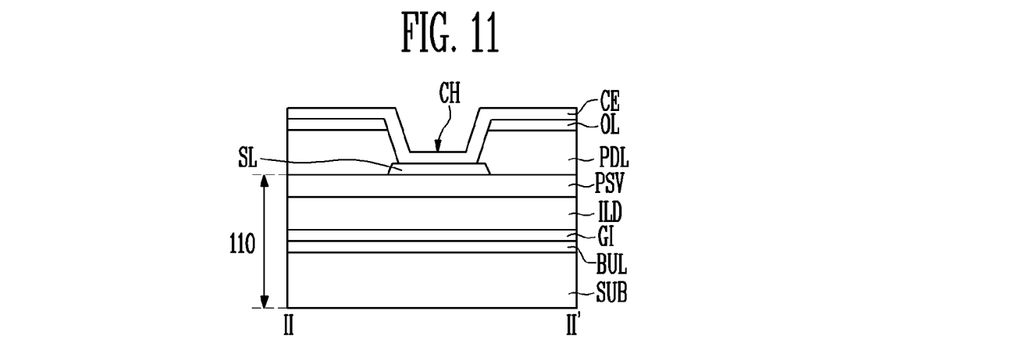
Figure 14:
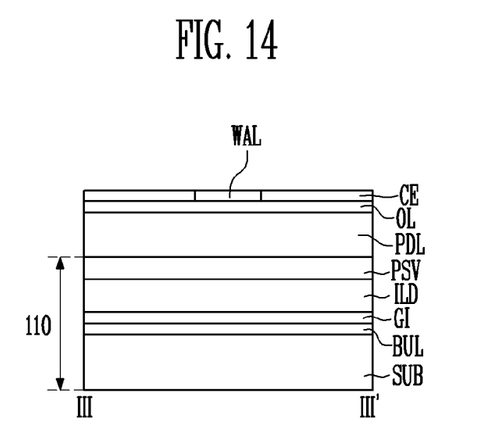

Referring to FIGS. 8, 11 and 14, after forming the contact hole CH, the second electrode CE may be formed on the organic layer OL. The second electrode CE may be a semi-transmitting reflective layer. Further, the second electrode CE may be formed by depositing a conductive material which has low work function compared with the transparent conductive layer. The second electrode CE may be connected to the sensing line through the contact hole CH, and may also be connected to a common line.

The second electrode CE may be arranged in the regions exposed by the electrode separation pattern WAL. In other words, the second electrode CE may be formed on the organic layer OL. The material included in the second electrode CE has low adhesion with the electrode separation pattern WAL. For example, when the adhesive force between the second electrode CE and the electrode separation pattern WAL is less than $1/10$ of the adhesive force between the second electrode CE and the organic layer OL, the second electrode CE may not be arranged on the electrode separation pattern WAL during a deposition process.

The second electrode CE may include a plurality of second electrode patterns separated by the electrode separation pattern WAL. The second electrode patterns may include the first sensing electrodes Rx, the second sensing electrodes Tx, and the ground pattern GND. Further, the second electrode patterns may be connected to the sensing line SL through the contact hole CH.

Figure 12:
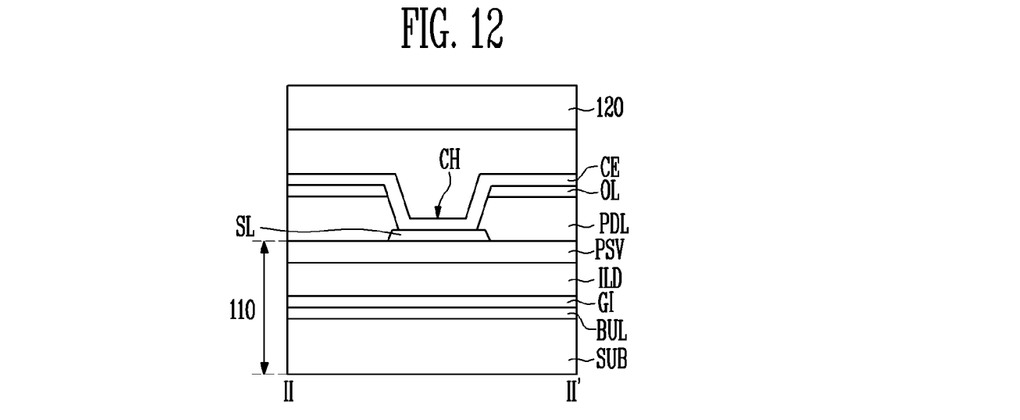
Figure 15:
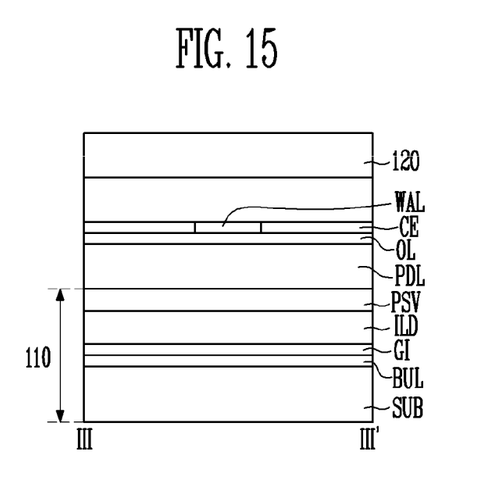

Referring to FIGS. 9, 12 and 15, after forming the second electrode CE, the second substrate 120 may be arranged on the second electrode CE, and the first substrate 110 and the second electrode 120 may be bonded together using a sealant. The second substrate 120 may include the same material as the base substrate SUB.

Fabrication of the display device may be simplified compared with a method of manufacturing a touch screen separately and attaching the touch screen to the display device, or a method of manufacturing the touch screen to the outside of the display device. In other words, since the elements constituting the touch screen are formed with the display elements at the same time, manufacture of the display device forming the touch screen may be simplified.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims. Various features of the above described and other embodiments can be mixed and matched in any manner, to produce further embodiments consistent with the invention.

As described, the display device may include the elements forming the touch screen. Since one of the electrodes of the display device may function as the sensing electrode, it is advantageous for slimming of the display device. Further, since the elements constituting the touch screen may be formed with the display elements at the same time, the fabrication process may be simplified.

What is claimed is:

1. A display device, comprising:
    a substrate including a plurality of pixel regions, each of the plurality of pixel regions including a thin film transistor and a passivation layer disposed on the thin film transistor;
    an anode disposed in each of the pixel regions of the substrate and connected to the thin film transistor;
    an organic layer disposed on the anode;
    a cathode including cathode patterns, each of the cathode patterns overlapping at least two pixel regions in a plan view and disposed on the organic layer;
    a plurality of sensing lines spaced apart from the anode and disposed on a same layer as the anode, the plurality of sensing lines being connected to respective ones of the cathode patterns and being formed of a same material and formed at the same time as the anode; and
    a plurality of ground lines spaced apart from the anode and disposed on a same layer as the anode, the plurality of ground lines being formed at the same time as the anode and the plurality of sensing lines,
    wherein the cathode patterns further comprise ground patterns connected to respective ones of the plurality of ground lines,
    wherein the anode, the plurality of sensing lines, and the plurality of ground lines are disposed on the passivation layer.

2. The display device of claim 1, further comprising an electrode separation pattern disposed between adjacent cathodes patterns and including an insulating material,
    wherein the electrode separation pattern is disposed on the organic layer and is disposed on a same layer as the cathode.

3. The display device of claim 1, further comprising a pixel definition layer including an opening exposing the anode in the plurality of pixel regions, and contact holes exposing the plurality of sensing lines,
    wherein the cathode patterns are connected to respective sensing lines through the contact holes.

4. The display device of claim 1, wherein the plurality of sensing lines are arranged between adjacent pixel regions and extend in one direction.

5. The display device of claim 1, wherein the cathode patterns comprise:
    first sensing electrodes electrically connected to the plurality of sensing lines that are extending along a first direction and including a plurality of sensing cells successively arranged along the first direction; and
    second sensing electrodes each extending along a second direction crossing the first direction,
    wherein the sensing cells and the second sensing electrodes are spaced apart from each other.

6. The display device of claim 5, wherein the ground patterns are arranged between the sensing cells and the second sensing electrodes.

7. The display device of claim 1, wherein the cathode patterns include a plurality of sensing cells each having an island shape, and
    the sensing cells are connected to respective ones of the plurality of sensing lines.

8. The display device of claim 2, wherein an adhesive force between the cathode patterns and the electrode separation patterns is less than 1/10 of an adhesive force between the cathode patterns and the organic layer.

9. A method of manufacturing a display device, the method comprising:
    receiving a substrate including a plurality of pixel regions, each of the plurality of pixel regions including a thin film transistor and a passivation layer disposed on the thin film transistor;
    forming anodes each connected to the thin film transistor and disposed in each of the plurality of pixel regions of the substrate, and ground lines and sensing lines spaced apart from the anodes, the anodes, the ground lines and the sensing lines being formed of a same material and formed at the same time;
    forming a pixel definition layer exposing the anodes;
    forming an organic layer on the anodes; and
    forming a cathode arranged on the organic layer
    wherein the cathode includes cathode patterns, each of the cathode patterns overlapping at least two pixel regions in a plan view, and the cathode patterns being connected to the sensing lines, and
    wherein the anodes, the sensing lines, and the ground lines are disposed on the passivation layer.

10. The manufacturing method of claim 9, wherein the forming a cathode further comprises:

forming an electrode separation pattern arranged on the organic layer and exposing a plurality of regions that overlap respective pixel regions;

forming a contact hole in the organic layer and the pixel definition layer, the contact hole exposing the sensing lines; and forming the cathode patterns by depositing a conductive material in the regions exposed by the electrode separation patterns.

11. The manufacturing method of claim 10, wherein an adhesive force between the cathode patterns and the electrode separation pattern is less than 1/10 of an adhesive force between the cathode patterns and the organic layer.

12. The manufacturing method of claim 9, wherein the sensing lines are arranged between adjacent pixel regions and extend in one direction.

13. The manufacturing method of claim 9, wherein the cathode comprises:

first sensing electrodes electrically connected to the sensing lines and including a plurality of sensing cells successively arranged along a first direction; and second sensing electrodes each extending along a second direction crossing the first direction;

wherein the sensing cells and the second sensing electrodes are spaced apart from each other.

14. The manufacturing method of claim 13, further comprising ground patterns arranged between the sensing cells and the second sensing electrodes.

15. The manufacturing method of claim 9, wherein the cathode patterns include a plurality of sensing cells each having an island shape, wherein the sensing cells are connected to respective ones of the sensing lines.

* * * * *